United States Patent
Gulick

(10) Patent No.: US 6,889,262 B1
(45) Date of Patent: May 3, 2005

(54) DIRECT TRANSACTION MODE FOR PERIPHERAL DEVICES

(75) Inventor: Dale E. Gulick, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 85 days.

(21) Appl. No.: 10/180,670

(22) Filed: Jun. 26, 2002

(51) Int. Cl.[7] .............................................. G06F 3/00
(52) U.S. Cl. ......................... 710/5; 710/15; 710/52
(58) Field of Search ........................... 710/1, 5, 18, 19, 710/31, 36, 52, 72, 112, 125, 225, 28, 126, 35

(56) References Cited

U.S. PATENT DOCUMENTS

| | | | |
|---|---|---|---|
| 4,811,283 A | * 3/1989 | Gembarowski | 364/900 |
| 4,942,523 A | * 7/1990 | Gembarowski | 364/200 |
| 5,175,732 A | * 12/1992 | Hendel et al. | 370/94.1 |
| 5,339,439 A | 8/1994 | Latimer et al. | |
| 5,845,151 A | 12/1998 | Story et al. | 395/847 |
| 6,092,158 A | 7/2000 | Harriman et al. | |
| 6,279,064 B1 | 8/2001 | Bronson et al. | |
| 6,370,603 B1 | 4/2002 | Silverman et al. | 710/72 |
| 6,412,022 B1 | * 6/2002 | Kumpf et al. | 710/1 |
| 6,412,028 B1 | 6/2002 | Steed et al. | 710/22 |
| 6,418,494 B1 | * 7/2002 | Shatas et al. | 710/126 |
| 6,427,180 B1 | * 7/2002 | Bastian et al. | 710/112 |
| 6,549,958 B1 | 4/2003 | Kuba | 710/14 |
| 6,615,288 B1 | 9/2003 | Herzi | 710/10 |

* cited by examiner

*Primary Examiner*—Fritz Fleming
*Assistant Examiner*—Alan Chen
(74) *Attorney, Agent, or Firm*—Meyertons Hood Kivlin Kowert & Goetzel, P.C.; B. Noël Kivlin

(57) ABSTRACT

A method and system for more directly reading from or writing to a peripheral device coupled to a computer via a standard communication protocol (such as Universal Serial Bus (USB)) by bypassing portions of the standard communication technology. The host controller monitors the status of a direct command queue after the completion of each standard communication transaction. If a command is present in the direct command queue, the command is carried out before any standard communication transactions are performed. If no command is present in the direct command queue, a standard communication transaction is carried out. The relatively long latency encountered when accessing critical command status registers via standard communication technology is thus avoided.

20 Claims, 4 Drawing Sheets

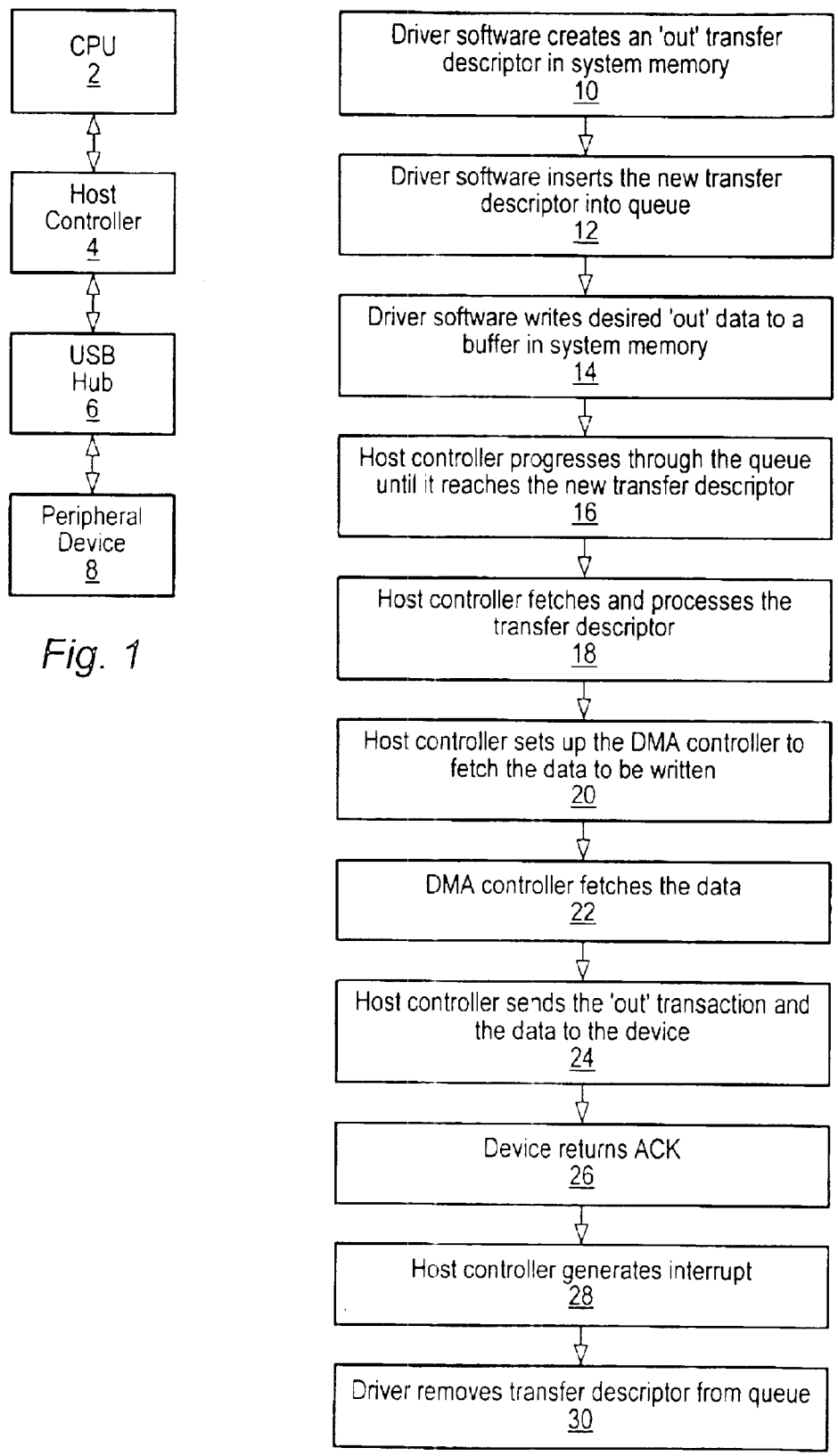

… (1)

DIRECT TRANSACTION MODE FOR PERIPHERAL DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the transmission of data to and from peripheral devices coupled to a computer system and more particularly to a method and a system for more direct communication to and from a peripheral device coupled to a computer system via a Universal Serial Bus.

2. Background of the Invention

Universal Serial Bus (USB) is a computer hardware interface for peripheral devices such as keyboards, mice, printers, and scanners. The USB-1 technology that appeared in consumer products in the late 1990's has recently been superseded by a USB-2 specification. The Universal Serial Bus Specification, Revision 2.0, dated Apr. 27, 2000 (USB-2), was written by a consortium of technology companies to improve the capabilities of USB technology and is incorporated herein by reference.

A typical configuration for coupling a peripheral device to a computer via USB technology is shown in FIG. 1. A CPU 2 is coupled to a host controller 4 which is coupled to a USB hub 6 which in turn is coupled to one or more peripheral devices 8. The host controller 4 is generally a device that processes data transactions between the CPU 2 and peripheral devices 8. Host controller interfaces used with USB-1 technology include Universal Host Controller Interface (UHCI) and Open Host Controller Interface (OHCI). An Enhanced Host Controller Interface (EHCI) has been developed for use with USB-2. A detailed description of the typical EHCI technology can be found in the Intel Corporation document Enhanced Host Controller Interface for Universal Serial Bus, Revision 1.0, dated Mar. 12, 2002, which is incorporated herein by reference.

With USB-1 technology, a frame of data is sent every one millisecond. The reading and writing process can thus consume a considerable amount of time when multiple frames are transmitted. As a result, USB-1 is not particularly amenable to the real-time control of devices.

USB-2 was designed as an improvement over USB-1 in part because it reduces the data frame transmission rate to 125 microseconds by creating eight subframes or microframes in each one-millisecond frame. The overriding one-millisecond frame structure still exists but each frame is broken into eight subpieces. Also, instead of running at the 12 megabit per second data transmission rate used by USB-1, USB-2 runs at 480 megabits per second. Thus, USB-2 is considerably faster than USB-1.

Even in USB-2, however, time delays still exist in the communications with peripherals in that the reading and writing processes still require calling a driver. These drivers generally determine the work to be done and place the appropriate instructions (often called transfer descriptors) in an appropriate queue to be accessed by the host controller. The transfer descriptor then waits in memory until the host controller completes processing all other requests ahead of the transfer descriptor in the queue. The host controller then generally determines what needs to be done, does it, and records that it has been done.

This standard communication process is adequate for routine tasks such as sending a file of data but the number of steps that must be taken, the delay in a transfer descriptor progressing through the queue, and the latency involved in multiple memory fetches make this a poor structure for real-time control of devices.

BRIEF SUMMARY OF THE INVENTION

The present invention is directed to providing methods and a system for faster and more direct communications to peripheral devices coupled to a computer system. Embodiments of the present invention achieve this direct communication by bypassing portions of the standard communications technology. Currently, many peripheral devices are connected via USB technology. Thus, embodiments of the invention contemplate bypassing portions of the standard USB protocol. More specifically, for USB technology, the host controller is coupled to a direct command queue to monitor the status of the direct command queue after the completion of each standard USB transaction. If a command is present in the direct command queue, the command is carried out before any standard USB transactions are performed. If no command is present in the direct command queue, a standard USB transaction is carried out. The relatively long latency encountered when using the standard USB protocol is thus avoided, allowing faster access to critical command and status registers.

An embodiment of the inventive system includes a host controller coupled to a direct command queue that can store commands for direct communication transactions to peripheral devices. Before each standard communication transaction with a peripheral device, the host controller checks whether a command is present in the direct command queue. When a command is present in the direct command queue, the host controller performs the direct communication transaction designated by the command before proceeding with the next standard communication transaction. When a command is not found in the direct command queue, the host controller performs the next standard communication transaction. The peripheral devices can be coupled to the system using USB technology and more specifically the USB-1 and USB-2 protocols. A write queue that can store at least one data string to be written to a peripheral device in a direct communication transaction can be coupled to the host controller. When a command calling for a write transaction is present in the direct command queue, a data string is retrieved from the write queue and is written to a peripheral device designated by the command. A read queue for storing at least one data string to be read from a peripheral device in a direct communication transaction can be coupled to the host controller. The read queue can also be coupled to a CPU such that the CPU can read the data string in the read queue. When a command calling for a read transaction is present in the direct command queue, a data string is retrieved from a peripheral device designated by the command and is stored in the read queue. A transaction state machine can be coupled to the host controller and the direct command queue to check, before execution of a standard communication transaction, whether a command is present in the direct command queue. The host controller can check the transaction state machine to determine whether a direct communication transaction or a standard communication transaction is to be performed. For USB applications, the host controller can be an OHCI, UHCI, or EHCI.

Another embodiment of the present invention comprises processing standard and direct communication transactions to peripheral devices by a host controller, storing commands for direct communication transactions to peripheral devices in a direct command queue coupled to the host controller, and determining whether a command is present in the direct command queue before each standard communication transaction with a peripheral device. When a command is found in the direct command queue, the direct communication transaction designated by the command is performed before proceeding with the next standard communication transaction. When a command is not found in the direct command queue, the next standard communication transaction is performed. The method can be used with communication transactions wherein the peripheral devices are coupled to the host controller using the standard USB technology and more specifically the USB-1 and USB-2 protocols. After a direct communication transaction is performed, it is determined whether a command is present in the direct command queue before proceeding with the next standard communication transaction. Data strings to be written to a peripheral device in a direct communication transaction are stored in a write queue coupled to the host controller. Data strings read from a peripheral device in a direct communication transaction are stored in a read queue coupled to the host controller. The read queue is coupled to a CPU such that the CPU can read the data string in the read queue. When a command calling for a write transaction is present in the direct command queue, a data string is retrieved from the write queue and written to a peripheral device designated by the command. When a command calling for a read transaction is present in the direct command queue, a data string is retrieved from a peripheral device designated by the command and stored in the read queue. The step of checking whether a command is present in the direct command queue is performed by the host controller or by a transaction state machine coupled to the host controller before execution of the next standard communication transaction. The host controller can check the transaction state machine to determine whether a direct communication transaction or a standard communication transaction is to be performed. The host controller can be an OHCI, UHCI, or EHCI.

BRIEF DESCRIPTION OF THE DRAWINGS

For a detailed description of the preferred embodiments of the invention, reference will now be made to the accompanying drawings in which:

FIG. 1 is a block diagram of a typical configuration for the connection of a peripheral device to a central processing unit (CPU) via USB technology;

FIG. 2 is a flowchart of typical steps in the "write" process using USB technology;

NOTATION AND NOMENCLATURE

Figure 3:
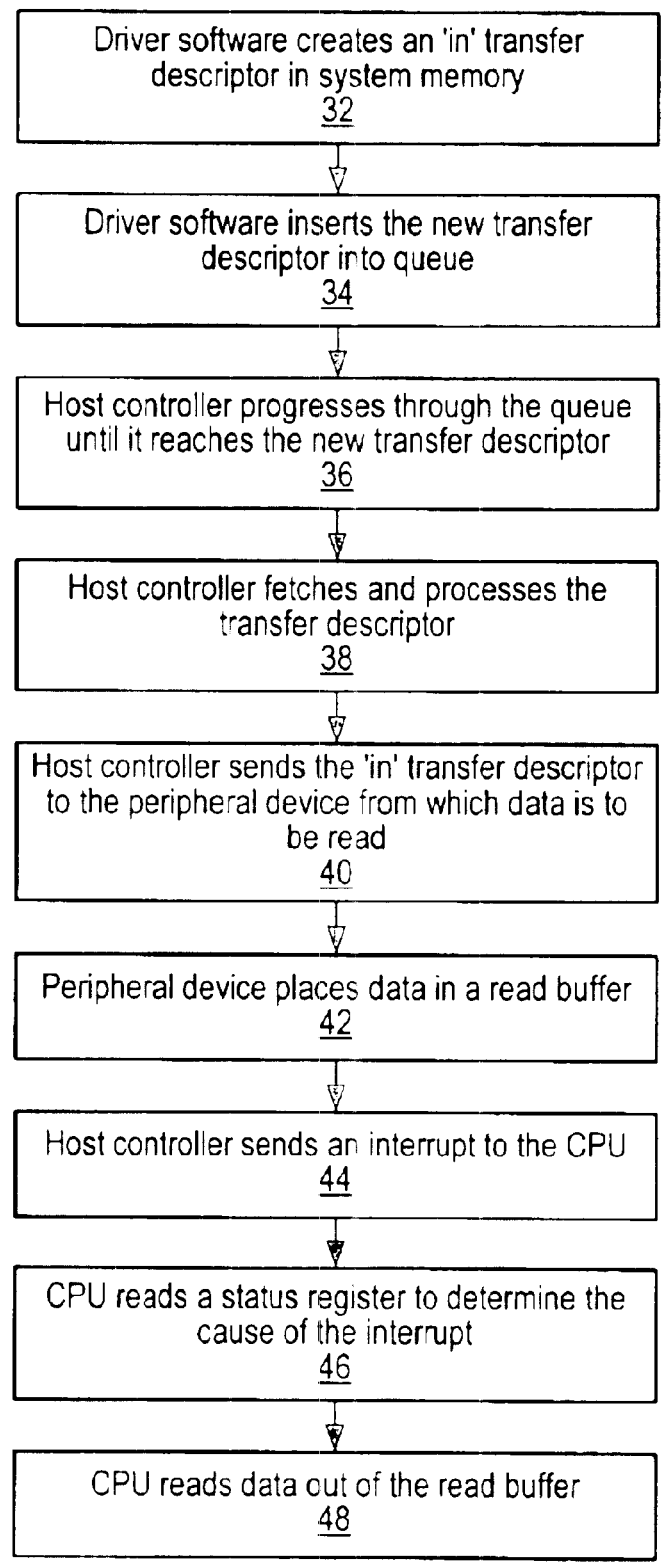
FIG. 3 is a flowchart of typical steps in the "read" process using USB technology.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" (and derivatives thereof) is intended to mean either an indirect or direct connection. Thus, if a first device couples to a second device, that connection may be through a direct connection, or through an indirect connection via other devices and connections.

The technology described in the Universal Serial Bus Specification, Revision 2.0, dated Apr. 27, 2000 and the earlier USB-1 technology will be referred to as the standard USB protocol.

DETAILED DESCRIPTION OF EMBODIMENTS

The transmission of data to and from peripheral devices coupled to a computer system can be exemplified by a transmission via the standard USB protocol depicted in FIG. 1. The standard USB protocol forces all transactions between the host controller 4 and peripheral devices 8 to be handled through a software-controlled queue structure. To read or write a register within a device, software must insert a command into the memory-resident queue structure. The command is carried out only after the host controller 4 completes the commands ahead of the new command in the queue. For a "write" request, such as the sending of a packet of data from the CPU 2 to a printer, an appropriate set of instructions would be placed in the host controller 4 and would be transferred to the printer via hub 6. Similarly, for a "read" request, such as the input of data into the CPU 2 from a scanner, an appropriate set of instructions would be placed in the host controller 4 to allow the scanned data to pass from the scanner to the CPU 2.

Under the standard USB protocol, the instructions that tell the host controller 4 what to do are referred to as transfer descriptors. A transfer descriptor includes the information necessary to describe the data packets to be transferred. Data fields within a transfer descriptor can include the memory location of the data to be transferred and a completion status code. Transfer descriptors are linked in a first in, first out queue; that is, the first transfer descriptor to enter a queue is the first to be processed. Typically, there are two separate queues or schedules of transfer descriptors, one for periodic transfers and one for nonperiodic transfers. The periodic schedule is typically used for isochronous data transfers such as audio or video. Transmissions such as these tend to need a consistent data transfer rate to maintain the integrity of the audio or video image. The nonperiodic schedule is typically used for bulk traffic; that is, data that can be transmitted on a time-available basis rather than requiring a consistent transfer rate. Herein, both periodic and nonperiodic transfers will be referred to generally as standard communication transactions.

A software driver running from the operating system of the CPU 2 builds these queues of descriptors based on the data transfer needs between the CPU 2 and a peripheral device 8. The host controller 4, operating on a clock that is independent from the clock of the CPU 2, fetches the next transfer descriptor out of memory that tells it where in memory the data to be transferred is located, i.e., where the buffer is that it is supposed to transmit. The host controller 4 determines the action to be taken, such as sending data to a printer. The host controller 4 then fetches the data and transmits it. For a nonperiodic transfer, the host controller 4 receives a response that the data was transferred properly. For an isochronous case, there is no response. The host controller 4 then updates the descriptor that the transfer occurred successfully.

As an example of a transaction between a computer system and a peripheral device and more specifically a transaction using the standard USB protocol, FIG. 2 shows a typical set of steps involved in a write to a register. In box 10, driver software creates an 'out' transfer descriptor in system memory. In box 12, driver software modifies pointers within the existing queue structure to insert the new transfer descriptor into the queue. This must be done in such a way as to maintain coherency with existing items in the queue. Driver software writes the desired 'out' data to a buffer in system memory in box 14. In box 16, the host controller progresses through the queue until it reaches the new queue item. The host controller fetches the transfer descriptor from the memory-resident queue and processes it in box 18. In box 20, the host controller sets up a direct memory access (DMA) controller to fetch the data to be written to the device. The DMA controller fetches the data from memory in box 22. In box 24, the host controller sends the 'out' transaction and the data to the device. In box 26, the device returns a handshake packet acknowledging receipt of the data (an ACK). The host controller generates an interrupt in box 28 and in box 30 the device driver removes the item from the queue.

Reading from a register is similarly involved. A typical read process is depicted in FIG. 3. To read the status of a set of switches on a printer, for example, driver software first creates an 'in' transfer descriptor in system memory in box 32. Driver software then inserts the new transfer descriptor into the queue in box 34. In box 36, the host controller progresses through the queue until it reaches the new item. The host controller fetches and processes the transfer descriptor in box 38. In box 40, the host controller sends the 'in' transfer descriptor to the peripheral device from which data is to be read. The peripheral device places the data in a read buffer in box 42. In box 44, the host controller sends an interrupt to the CPU. In box 46, the CPU reads a status register to determine the cause of the interrupt. The CPU then reads the data out of the read buffer in box 48.

The present invention is directed to providing methods and a system for faster and more direct communications to peripheral devices coupled to a computer system. Embodiments of the present invention achieve this direct communication by bypassing portions of the standard communications technology. Currently, many peripheral devices are connected via USB technology. Thus, embodiments of the invention contemplate bypassing portions of the standard USB protocol. More specifically, for USB technology, the host controller is coupled to a direct command queue to monitor the status of the direct command queue after the completion of each standard USB transaction. If a command is present in the direct command queue, the command is carried out before any standard USB transactions are performed. If no command is present in the direct command queue, a standard USB transaction is carried out. The relatively long latency encountered when using the standard USB protocol is thus avoided, allowing faster access to critical command and status registers.

Figure 4:
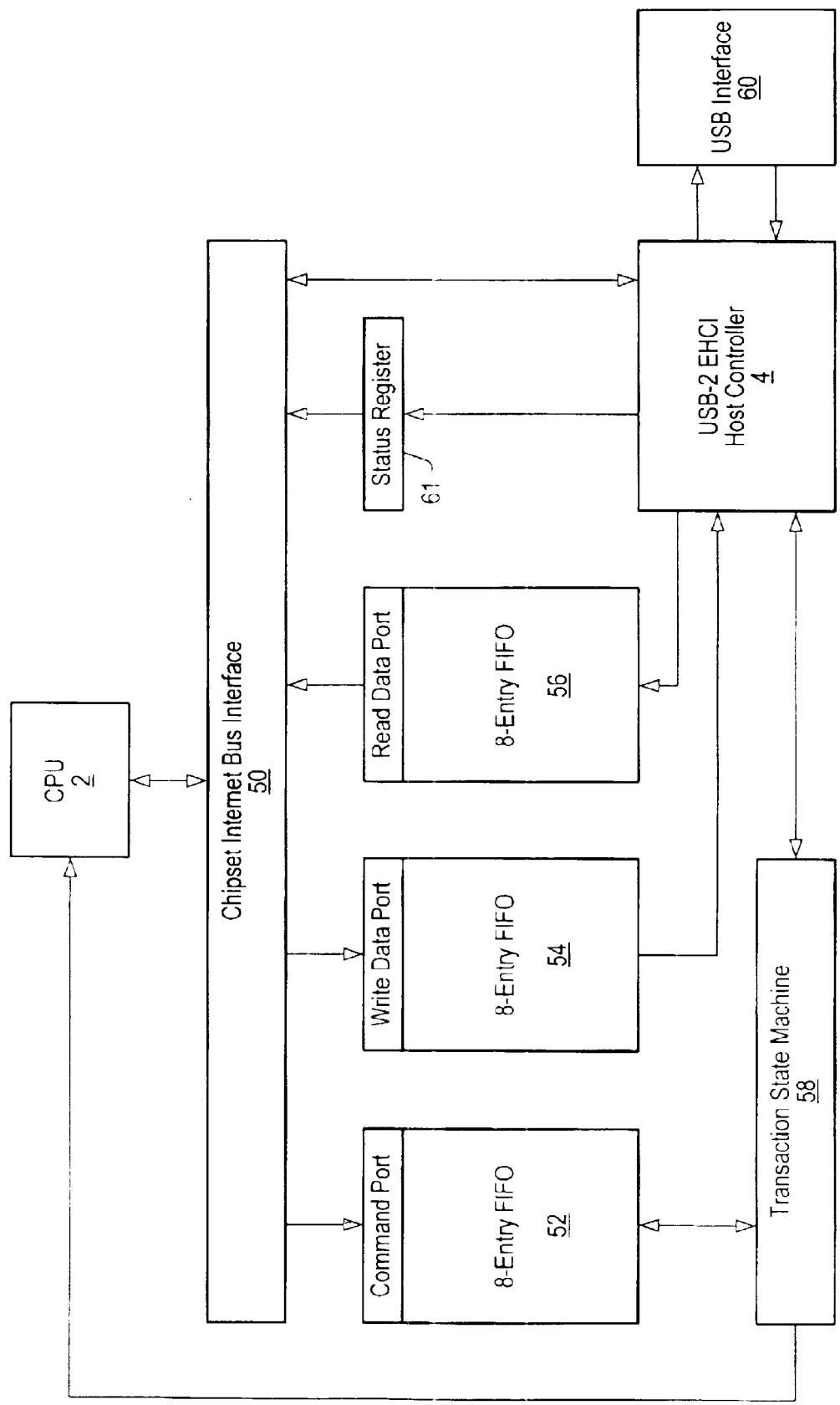
FIG. 4 is a block diagram of the components in an embodiment of the invention for performing direct communication transactions.

An embodiment of the invention for direct communication transactions is shown in FIG. 4. A bus 50 carries commands and data to and from a computers central processing unit (CPU) 2. The CPU 2, via bus 50, writes commands into a direct command queue 52, typically an independent queue set up in the hardware of the computer to hold instructions regarding direct transfers. A single direct command queue 52 is used for both reads and writes. Each command in the direct command queue 52 describes a single read or write direct communication transaction. Data to be written is placed in a write queue 54 and data that has been read is placed in a read queue 56. A host controller 4, shown here as an EHCI for USB-2 technology, is coupled to the direct command queue 52. The host controller 4 receives a command from the direct command queue 52 and performs the appropriate direct communication transaction (direct read or write) as described in the command. That is, data is written from the write queue 54 to a peripheral device or read from a peripheral device to the read queue 56.

In this embodiment, the direct command queue 52, the write queue 54, and the read queue 56 operate on a first in, first out (FIFO) basis; that is, the first entry placed in one of the queues is the first entry to be removed from the queue. Each of the three queues typically can contain up to eight entries but any number could be used. Each entry, or data string, in the write queue 54 and the read queue 56 is typically a double length word of data (i.e., 32 bits long) but other data lengths could be used. Entries in the direct command queue 52 are typically 15 bits long. These 15 bits can be broken down into four bits for the packet ID to be read from or written to, seven bits for the address to be read from or written to, and four bits for the peripheral device to be read from or written to.

In this embodiment, a transaction state machine 58 monitors the status of the host controller 4 and manages the direct command queue 52. The transaction state machine 58 acts as a third, direct scheduler in addition to the periodic and nonperiodic schedules of the standard USB protocol. Each time the host controller 4 completes a standard communication transaction, such as a USB transaction, the transaction state machine 58 checks whether a command is present in the direct command queue 52. If a command is present, the transaction state machine 58 directs the host controller 4 to carry out the command in the direct command queue 52 specifying the direct communication transaction. The appropriate writing from the write queue 54 or reading into the read queue 56 directly to or from a register in a peripheral device is then performed. If no command is present in the direct command queue 52, the transaction state machine 58 instructs the host controller 4 to proceed with the normal processing of standard communication transactions using the standard USB protocol, via USB interface 60. Alternatively, the transaction state machine 58, as it functions in whole or in part, may be incorporated in the host controller 4.

A status register 61 is coupled to the host controller 4 and the CPU 2. The status register 61 includes a status bit that can indicate when a command has been completed. Upon the completion of a read transaction, the host controller 4 updates the transaction state machine 58 and the status bit in the status register 61. The transaction state machine 58 then sends an interrupt to the CPU 2 and the CPU 2 checks the status register 61. The status bit in the status register 61 informs the CPU 2 that a read has been done. The CPU 2 then retrieves the data from the read queue 56.

Figure 5:
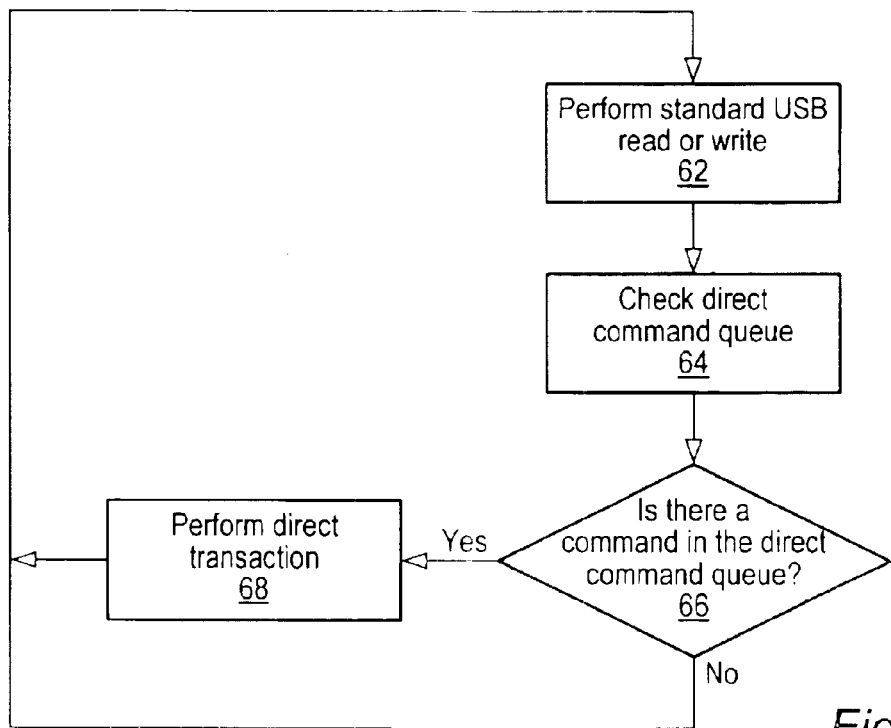
FIG. 5 is a flowchart of the steps taken by an embodiment of the invention for performing direct communication transactions.

The steps for one embodiment of the direct transaction process are shown in FIG. 5. In box 62, a standard USB read or write transaction is performed. In box 64, the direct command queue 52 is then checked. A decision is made in box 66 based on whether or not a command is present in the direct command queue 52. If no command is present in the direct command queue 52, another standard USB transaction is performed as shown in box 62. If a command is present in the direct command queue 52, the appropriate direct read or write transaction is performed as shown in box 68. The flow then returns to box 62 where another standard USB transaction is performed.

Figure 6:
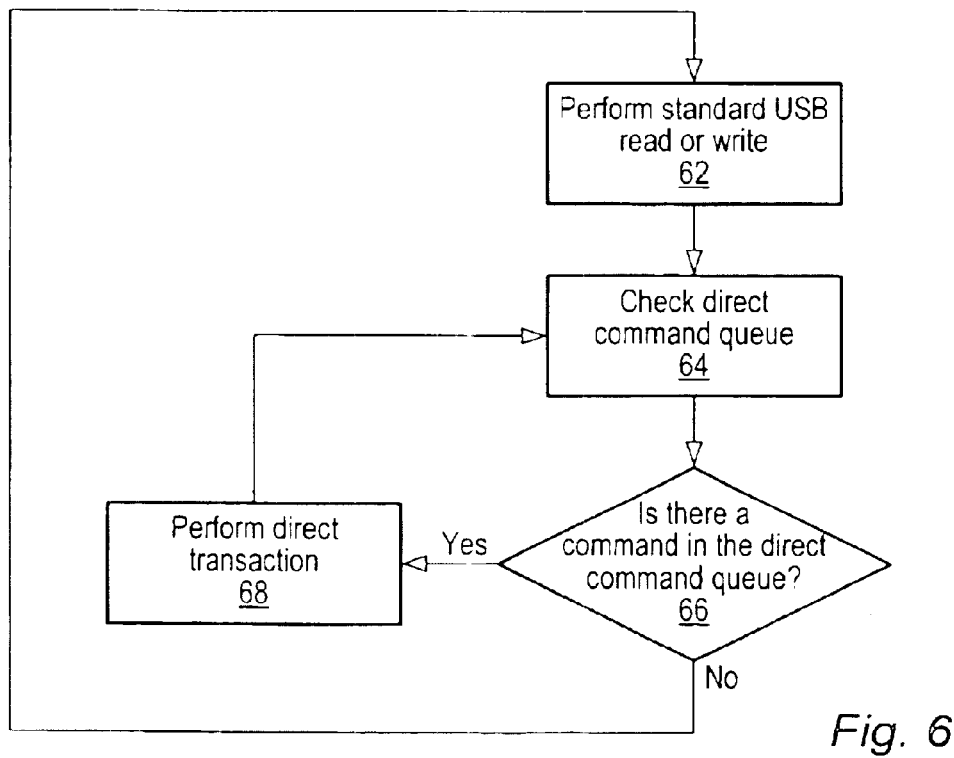
FIG. 6 is a flowchart of the steps taken by another embodiment of the invention for performing direct communication transactions.

In an alternative embodiment, the steps shown in FIG. 6 can be followed. In this embodiment, after a direct transaction is performed in box 68, the direct command queue is again checked in box 64. This loop of checking the direct command queue, deciding whether there is a command in the direct command queue, and performing a direct transaction continues as long as there is a command in the direct command queue. A standard USB read or write, as shown in box 62, is performed only when no more commands are present in the direct command queue. This embodiment may not be as desirable as that shown in FIG. 5 since the processing of a large number of direct transactions could cause a delay in performing standard USB transactions.

The direct command queue 52, write queue 54, read queue 56, and state machine 58 can be viewed as a direct transaction port. The direct transaction port can be implemented internally or externally to the host controller 4, in whole or in part. Accordingly, the functionality of the queues 52, 54, 56 or the state machine 58 could be incorporated in the host controller in whole or in part.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for more direct communication between a CPU and a peripheral device comprising:
   a host controller through which standard and direct communication transactions to peripheral devices are processed;
   a direct command queue coupled to said host controller, to store commands for direct communication transactions to peripheral devices; and
   a write queue coupled to said host controller for storing at least one data string to be written to a peripheral device in a direct communication transaction;
   wherein the host controller determines, before each standard communication transaction with a peripheral device, whether a command is present in the direct command queue and wherein, when a command calling for a write transaction is present in the direct command queue, a data string is retrieved from the write queue and is written to a peripheral device designated by the command.

2. The system of claim 1 wherein, when the host controller determines there is a command in the direct command queue, the host controller performs the direct communication transaction designated by the command before proceeding with the next standard communication transaction.

3. The system of claim 1 wherein, when the host controller determines there is not a command in the direct command queue, the host controller performs the next standard communication transaction.

4. The system of claim 1 wherein, after the direct communication transaction has been performed, the host controller determines whether a command is present in the direct command queue before proceeding with the next standard communication transaction.

5. The system of claim 1 further comprising a transaction state machine coupled to said host controller and said direct command queue to check, before execution of the next standard communication transaction, whether a command is present in the direct command queue.

6. A system for more direct communication between a CPU and a peripheral device comprising:
   a host controller through which standard and direct communication transactions to peripheral devices are processed;
   a direct command queue coupled to said host controller, to store commands for direct communication transactions to peripheral devices; and
   a read queue coupled to said host controller for storing at least one data string that has been read from a peripheral device in a direct communication transaction;
   wherein the host controller determines, before each standard communication transaction with a peripheral device, whether a command is present in the direct command queue and wherein, when a command calling for a read transaction is present in the direct command queue, a data string is retrieved from a peripheral device designated by the command and is stored in the read queue.

7. The system of claim 6 wherein, when the host controller determines there is a command in the direct command queue, the host controller performs the direct communication transaction designated by the command before proceeding with the next standard communication transaction.

8. The system of claim 6 wherein, when the host controller determines there is not a command in the direct command queue, the host controller performs the next standard communication transaction.

9. The system of claim 6 wherein, after the direct communication transaction has been performed, the host controller determines whether a command is present in the direct command queue before proceeding with the next standard communication transaction.

10. The system of claim 6 further comprising a transaction state machine coupled to said host controller and said direct command queue to check, before execution of the next standard communication transaction, whether a command is present in the direct command queue.

11. A method for more direct communication between a CPU and a peripheral device comprising:
    processing standard and direct communication transactions to peripheral devices by a host controller;
    storing commands for direct communication transactions to peripheral devices in a direct command queue coupled to said host controller;
    storing a data string to be written to a peripheral device in a direct communication transaction in a write queue coupled to said host controller;
    when a command calling for a write transaction is present in the direct command queue, retrieving a data string from the write queue and writing the data string to a peripheral device designated by the command; and
    determining whether a command is present in the direct command queue before each standard communication transaction with a peripheral device.

12. The method of claim 11 further comprising, when a command is found in the direct command queue, performing the direct communication transaction designated by the command before proceeding with the next standard communication transaction.

13. The method of claim 11 further comprising, when a command is not found in the direct command queue, performing the next standard communication transaction.

14. The method of claim 11 wherein, after the direct communication transaction is performed, determining whether a command is present in the direct command queue before proceeding with the next standard communication transaction.

15. The method of claim 11 wherein the step of checking whether a command is present in the direct command queue is performed by the host controller or a transaction state machine coupled to the host controller before execution of the next standard communication transaction.

16. A method for more direct communication between a CPU and a peripheral device comprising:

processing standard and direct communication transactions to peripheral devices by a host controller;

storing commands for direct communication transactions to peripheral devices in a direct command queue coupled to said host controller;

storing a data string read from a peripheral device in a direct communication transaction in a read queue coupled to said host controller;

when a command calling for a read transaction is present in the direct command queue, retrieving a data string from a peripheral device designated by the command and storing the data string in the read queue; and determining whether a command is present in the direct command queue before each standard communication transaction with a peripheral device.

17. The method of claim 16 further comprising, when a command is found in the direct command queue, performing the direct communication transaction designated by the command before proceeding with the next standard communication transaction.

18. The method of claim 16 further comprising, when a command is not found in the direct command queue, performing the next standard communication transaction.

19. The method of claim 16 wherein, after the direct communication transaction is performed, determining whether a command is present in the direct command queue before proceeding with the next standard communication transaction.

20. The method of claim 16 wherein the step of checking whether a command is present in the direct command queue is performed by the host controller or a transaction state machine coupled to the host controller before execution of the next standard communication transaction.

* * * * *